US012264040B2

(12) United States Patent
Babu

(10) Patent No.: US 12,264,040 B2
(45) Date of Patent: Apr. 1, 2025

(54) INTEGRATED NOISE SUPPRESSION APPARATUS FOR A PNEUMATIC VACUUM ELEVATOR

(71) Applicant: Killakathu Ramanathan Babu, Tamilnadu (IN)

(72) Inventor: Killakathu Ramanathan Babu, Tamilnadu (IN)

(73) Assignee: Killalathu Ramanathan Babu (IN)

( * ) Notice: Subject to any disclaimer, the term of this patent is extended or adjusted under 35 U.S.C. 154(b) by 94 days.

(21) Appl. No.: 17/928,632

(22) PCT Filed: May 31, 2021

(86) PCT No.: PCT/IB2021/054739
§ 371 (c)(1),
(2) Date: Nov. 30, 2022

(87) PCT Pub. No.: WO2021/245524
PCT Pub. Date: Dec. 9, 2021

(65) Prior Publication Data

US 2023/0136840 A1 May 4, 2023

(30) Foreign Application Priority Data

Jun. 2, 2020 (IN) ............................ 202041023098

(51) Int. Cl.
*B66B 11/04* (2006.01)
*B66B 9/04* (2006.01)
(Continued)

(52) U.S. Cl.
CPC ........ *B66B 11/0423* (2013.01); *B66B 11/004* (2013.01); *G10K 11/162* (2013.01); *B66B 9/04* (2013.01)

(58) Field of Classification Search
CPC ....... B66B 11/043; B66B 9/04; G10K 11/162; G10K 11/16; G10K 11/172; F04D 29/665; F04B 39/0033; F04B 39/0027; H02K 5/24
See application file for complete search history.

(56) References Cited

U.S. PATENT DOCUMENTS

2014/0238781 A1* 8/2014 Ascua ....................... B66B 9/04
187/250
2017/0190424 A1* 7/2017 Brown ...................... B64C 1/18

FOREIGN PATENT DOCUMENTS

CN 104401851 A 2/2017
EP 3441345 A2 2/2019

OTHER PUBLICATIONS

Machine Translation of CN 205892443.*

* cited by examiner

*Primary Examiner* — Diem M Tran
(74) *Attorney, Agent, or Firm* — Jason C. Cameron

(57) ABSTRACT

An integrated noise suppression apparatus for a pneumatic vacuum elevator is provided. The apparatus includes an equipment compartment which includes a first partition unit vertically surrounding one or more electric motors configured to suck air from elevator cylinders and release the air into atmosphere, a bottom plate comprising a channel, wherein an pneumatic flow control unit placed on top of the bottom plate configured to allow air from the atmosphere into the elevator cylinders, a second partition unit, a silencer unit which includes a first layer placed configured to initiate the circulation of air, a second layer having a first set of partition strips, a third layer having a second set of partition strips, a fourth layer, a fifth layer having a third set of
(Continued)

partition strips. A plurality of layers is arranged one above the other to enable the air to pass between the atmosphere and the tubular cylinder.

9 Claims, 8 Drawing Sheets

(51) Int. Cl.
*B66B 11/00* (2006.01)
*G10K 11/162* (2006.01)

INTEGRATED NOISE SUPPRESSION APPARATUS FOR A PNEUMATIC VACUUM ELEVATOR

CROSS-REFERENCE TO RELATED APPLICATION

This Application claims priority from a Patent application filed in India having Patent Application No. 202041023098, filed on Jun. 2, 2020, and titled "AN INTEGRATED NOISE SUPPRESSION APPARATUS FOR A PNEUMATIC VACUUM ELEVATOR" and a PCT Application No. PCT/IB2021/054739 filed on May 31, 2021, and titled "AN INTEGRATED NOISE SUPPRESSION APPARATUS FOR A PNEUMATIC VACUUM ELEVATOR".

FIELD OF INVENTION

Embodiments of the present disclosure relate to noise suppression in a pneumatic vacuum elevator, and more particularly, to an integrated noise suppression apparatus for a pneumatic vacuum elevator.

BACKGROUND

An elevator is a vertical transportation machine which is used to move people between floors of a structure. Among such elevators, pneumatic vacuum elevators are a type of elevator which uses air pressure to lift the elevator cab. The cab has a vacuum seal built into the ceiling. A challenge which arises is to maintain noise level of the elevator when being operated. In a conventional approach, where the pneumatic vacuum elevators are to be installed in any of the commercial locations or home, noise suppression unit is to be mounted independently. However, in such an approach, there may be a situation where the noise suppression unit which needs to be mounted on top of the elevator unit would not fit into the location; thus, the installation could not be accomplished, thereby making such approaches non-reliable and less efficient. Also, a level of suppression of noise in such approaches is a challenge, specially within the indoor environment.

Hence, there is a need for an improved integrated noise apparatus for a pneumatic vacuum elevator to address the aforementioned issues.

BRIEF DESCRIPTION

In accordance with the present disclosure, an integrated noise suppression apparatus for a pneumatic vacuum elevator is provided. The apparatus includes an equipment compartment mounted on top a top cylinder of one or more vertically stacked elevator cylinders. The equipment compartment includes a first partition unit vertically surrounding one or more electric motors housed inside the equipment compartment. The one or more electric motors are configured to suck air from one or more vertically stacked elevator cylinders and release the air into atmosphere surrounding, the equipment compartment cylindrical body to operate the pneumatic vacuum elevator in upward direction. The apparatus also includes a bottom plate comprising a channel positioned outside the first partition unit, wherein a pneumatic flow control unit placed on top of the bottom plate. The pneumatic flow control unit is configured to allow air from the atmosphere into the corresponding one or more elevator cylinders to operate the pneumatic vacuum elevator in downward direction. The apparatus also includes a second partition unit mechanically coupled to the first partition unit, wherein the second partition unit includes an opening in a pre-defined shape. The second partition unit is configured to circulate air between the equipment compartment and the atmosphere upon being sucked or released by the one or more electric motors or the pneumatic flow control unit respectively. The apparatus also includes a silencer unit placed below the one or more electric motors and the pneumatic flow control unit. The silencer unit includes a first layer placed upon the bottom plate and above the tubular cylinder. The first layer includes first set of partition strips arranged in a pre-defined fashion, wherein each of the first set of partition strips comprises a corresponding plurality of square cut-outs arranged in a first pre-defined fashion. The first layer is configured to initiate the circulation of air. The silencer unit also includes a second layer placed above the first layer, wherein the second layer includes a second set of partition strips arranged in a pre-defined fashion. Each of the first set of partition strips includes a corresponding plurality of square cut-outs arranged in a second pre-defined fashion. The silencer unit also includes a third layer placed above the second layer. The third layer includes a third set of partition strips arranged in a third pre-defined fashion. Each of the third set of partition strips comprises a corresponding plurality of square cut-outs arranged in a third pre-defined fashion. The silencer unit also includes a fourth layer placed above the third layer. The fourth layer includes a fourth set of partition strips arranged in a fourth pre-defined fashion. Each of the fourth set of partition strips comprises a corresponding plurality of square cut-outs arranged in a fourth pre-defined fashion. The silencer unit also includes a fifth layer placed above the fourth layer. The fourth layer includes a fifth set of partition strips. Each of the fifth set of partition strips includes a corresponding plurality of circular cut-outs arranged in a fifth pre-defined fashion. The plurality of circular cut-outs is structured to position the corresponding one or more electric motors. A plurality of layers is arranged one above the other to enable the air to pass between the atmosphere and the tubular cylinder via the plurality of layers. An arrangement of the first set of partition strips, the second set of partition strips and the third set of partition strips forms a pre-defined structure configured to absorb noise developed during operation of the pneumatic vacuum elevator upon air being circulated sequentially from the first layer to the fifth layer.

In accordance with another embodiment of the present disclosure, a pneumatic vacuum elevator is provided. The pneumatic vacuum elevator includes one or more vertically stacked elevator cylinders configured to enable one or more users to move between a plurality of floors of a multi-storied building. The pneumatic vacuum elevator also includes an integrated noise suppression apparatus integrated on top of the one or more elevator cylinders. The integrated noise suppression apparatus includes an equipment compartment mounted on top a top cylinder of one or more vertically stacked elevator cylinders. The equipment compartment includes a first partition unit vertically surrounding one or more electric motors housed inside the equipment compartment. The one or more electric motors are configured to suck air from one or more vertically stacked elevator cylinders and release the air into atmosphere surrounding the equipment compartment cylindrical body to operate the pneumatic vacuum elevator in upward direction. The apparatus also includes a bottom plate comprising a channel positioned outside the first partition unit, wherein an pneumatic flow control unit placed on top of the bottom plate. The pneumatic flow control unit is configured to allow air from the atmosphere into the corresponding one or more elevator cylinders to operate the pneumatic vacuum elevator in downward direction. The apparatus also includes a second partition unit mechanically coupled to the first partition unit, wherein the second partition unit includes an opening in a pre-defined shape. The second partition unit is configured to circulate air between the equipment compartment and the atmosphere upon being sucked or released by the one or more electric motors or the pneumatic flow control unit respectively. The apparatus also includes a silencer unit placed below the one or more electric motors and the pneumatic flow control unit. The silencer unit includes a first layer placed upon the bottom plate and above the tubular cylinder. The first layer includes first set of partition strips arranged in a pre-defined fashion, wherein each of the first set of partition strips comprises a corresponding plurality of square cut-outs arranged in a first pre-defined fashion. The first layer is configured to initiate the circulation of air. The silencer unit also includes a second layer placed above the first layer, wherein the second layer includes a second set of partition strips arranged in a pre-defined fashion. Each of the first set of partition strips includes a corresponding plurality of square cut-outs arranged in a second pre-defined fashion. The silencer unit also includes a third layer placed above the second layer. The third layer includes a third set of partition strips arranged in a third pre-defined fashion. Each of the third set of partition strips comprises a corresponding plurality of square cut-outs arranged in a third pre-defined fashion. The silencer unit also includes a fourth layer placed above the third layer. The fourth layer includes a fourth set of partition strips arranged in a fourth pre-defined fashion. Each of the fourth set of partition strips comprises a corresponding plurality of square cut-outs arranged in a fourth pre-defined fashion. The silencer unit also includes a fifth layer placed above the fourth layer. The fourth layer includes a fifth set of partition strips. Each of the fifth set of partition strips includes a corresponding plurality of circular cut-outs arranged in a fifth pre-defined fashion. The plurality of circular cut-outs is structured to position the corresponding one or more electric motors. A plurality of layers is arranged one above the other to enable the air to pass between the atmosphere and the tubular cylinder via the plurality of layers. An arrangement of the first set of partition strips, the second set of partition strips and the third set of partition strips forms a pre-defined structure configured to absorb noise developed during operation of the pneumatic vacuum elevator upon air being circulated sequentially from the first layer to the fifth layer.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting.

Embodiments of the present disclosure relates to an integrated noise suppression apparatus for a pneumatic vacuum elevator. As used herein, the term "a pneumatic vacuum elevator" is defined as a kind of an elevator which works on air pressure to lift the elevator cab.

Figure 1:
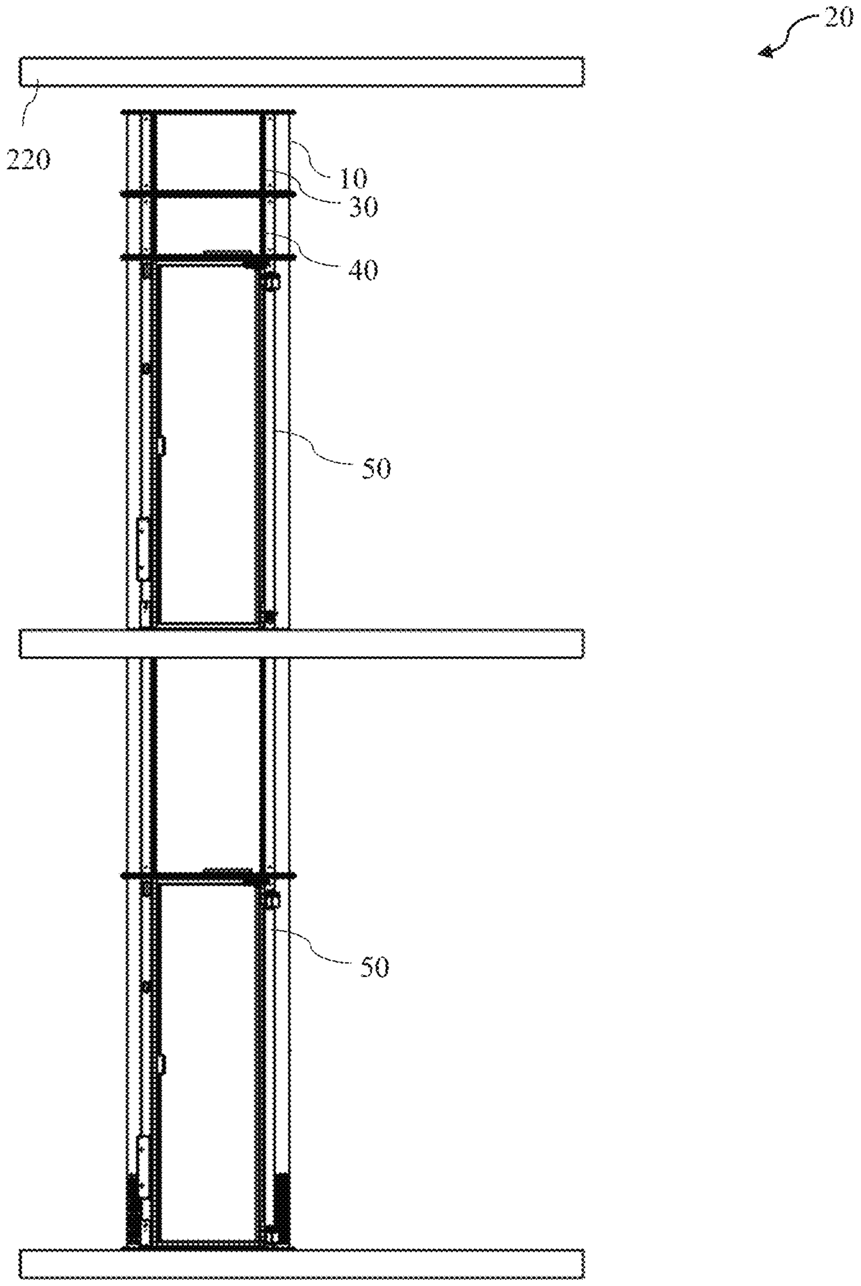
FIG. 1 is a schematic representation of an overall pneumatic vacuum elevator system comprising an integrated noise suspension unit in accordance with an embodiment of the present disclosure.

FIG. 1 is a schematic representation of an overall pneumatic vacuum elevator system 20 comprising an integrated noise suspension apparatus 10 in accordance with an embodiment of the present disclosure. The pneumatic vacuum elevator 10 includes one or more vertically stacked elevator cylinders 50 configured to enable one or more users to move between a plurality of floors of a multi-storied building. The pneumatic vacuum elevator 20 also includes an integrated noise suppression apparatus 10 integrated on top of the one or more elevator cylinders 40, 50, hereafter referred to as apparatus.

Figure 4:
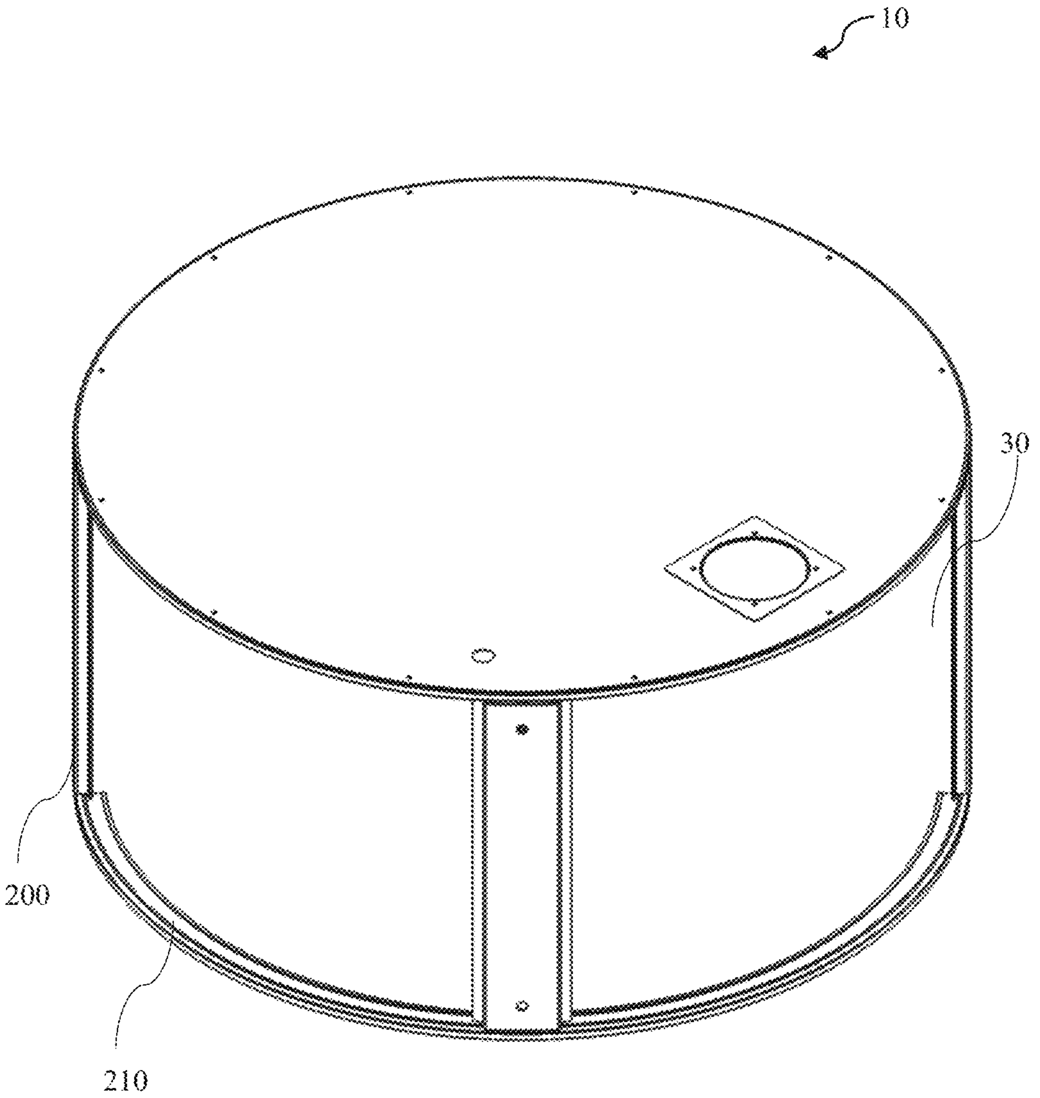
FIG. 4 is an isometric representation of an integrated noise suppression unit of FIG. 1 in accordance with an embodiment of the present disclosure.
Figure 5:
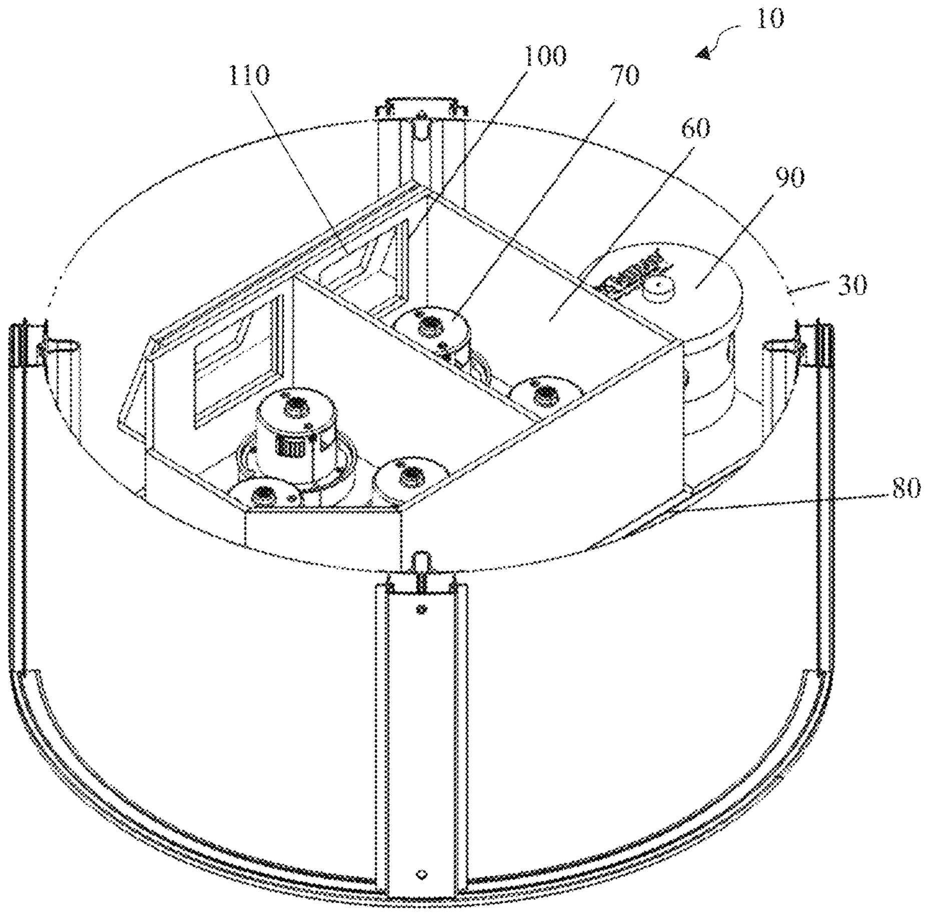
FIG. 5 is an isometric representation of an assemble section of the integrated noise suppression unit of FIG. 1 in accordance with an embodiment of the present disclosure.

Turing to FIG. 4 and FIG. 5, FIG. 4 is an isometric representation of the integrated noise suppression unit of FIG. 1 in accordance with an embodiment of the present disclosure. FIG. 5 is an isometric representation of an assemble section of the integrated noise suppression unit of FIG. 1 in accordance with an embodiment of the present disclosure. The apparatus 10 includes an equipment compartment 30 mounted on top of a cylinder of one or more vertically stacked elevator cylinders 65 resting on an elevator cabin 50. In one embodiment, the elevator cabin 50 may correspond to a cylinder 50 of the one or more elevator cylinders 50. More specifically, the pneumatic vacuum elevator 20 includes the one or more elevator cylinders 50 vertically stacked. The tubular cylinder 40 is stalked above one of the elevator cabin 50 and corresponds to a topmost cylinder of the one or more elevator cylinders 50. In one exemplary embodiment, the equipment compartment 30 may be composed of a Polycarbonate sheet. In another embodiment, the equipment compartment 30 may be fabricated of plastic, high-density polyethylene (HDPE), acrylic, medium-density fibreboard or any suitable material.

The apparatus 10 includes a first partition unit 60 vertically surrounding one or more electric motors 70 housed inside the equipment compartment 30. The first partition unit 60 may be arranged in a pre-defined fashion. The one or more electric motors 70 is configured to suck air from one or more vertically stacked elevator cylinders 50 and release the air into atmosphere surrounding the equipment compartment 30 to operate the pneumatic vacuum elevator 20 in upward direction. In one exemplary embodiment, the first partition unit 60 may be composed of a material selected from a group consisting plywood, Medium-density fibreboard (MDF), particle board and solid wood.

The apparatus 10 also includes a bottom plate 80 which includes a channel 85 positioned outside the first partition unit 60. A pneumatic flow control unit 90 placed on top of the bottom plate 80. More specifically, the pneumatic flow control unit 90 is placed on the bottom plate 80. In one embodiment, the bottom plate 80 may be composed of metal such as steel, or the like. The pneumatic flow control unit 90 is configured to allow air from the atmosphere into the corresponding one or more elevator cylinders 50 to operate the pneumatic vacuum elevator 20 in downward direction. In one embodiment, the channel 85 may be a guide through passage which may be configured to fix the bottom plate 80 within the first partition unit 60.

Furthermore, the apparatus 0 includes a second partition unit 100 mechanically coupled to the first partition unit 60. The second partition unit 100 includes an opening in a pre-defined shape. In one embodiment the pre-defined shape of the opening may be circular, square, rectangular or the like. The second partition unit 100 is configured to circulate air between the equipment compartment 30 and the atmosphere upon being sucked or released by the one or more electric motors 70 or the pneumatic flow control unit 90 respectively. More specifically, the air between the atmosphere and the equipment compartment 30 is circulated via the second partition unit 100. In one exemplary embodiment, the second partition unit 100 may be composed of a material selected from a group consisting plywood, Medium-density fibreboard (MDF), particle board and solid wood.

Figure 6A:
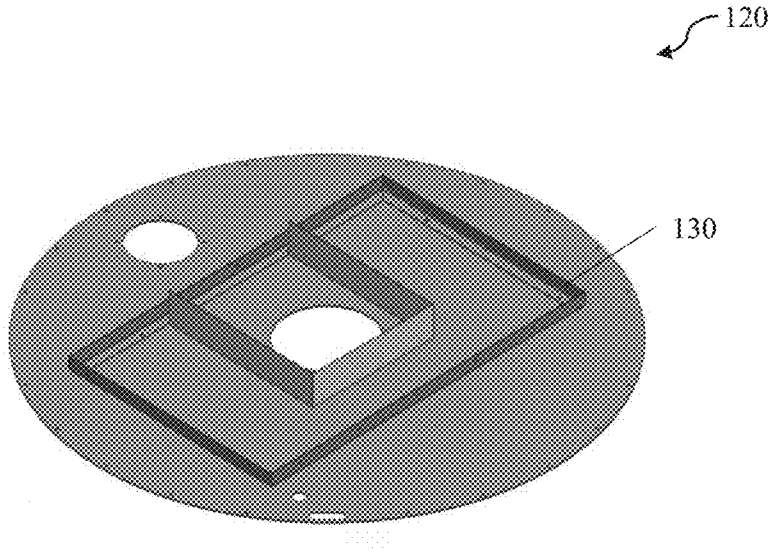
FIG. 6*a* is schematic representation of a first layer of a silencer unit of the integrated noise suppression unit of FIG. 1 in accordance with an embodiment of the present disclosure.

The apparatus 10 also includes a silencer unit 120 placed below the one or more electric motors 70 and the pneumatic flow control unit 90. The silencer unit 120 includes a first layer 130 (as shown in FIG. 6*a*) placed upon the bottom plate 80 and above the tubular cylinder 40. The first layer 130 is configured to initiate the circulation of air. The first layer 130 includes first set of partition strips arranged in a pre-defined fashion. Each of the first set of partition strips comprises a corresponding plurality of square cut-outs arranged in a first pre-defined fashion. The first set of partition strips is configured to initiate the circulation of air.

Figure 6B:
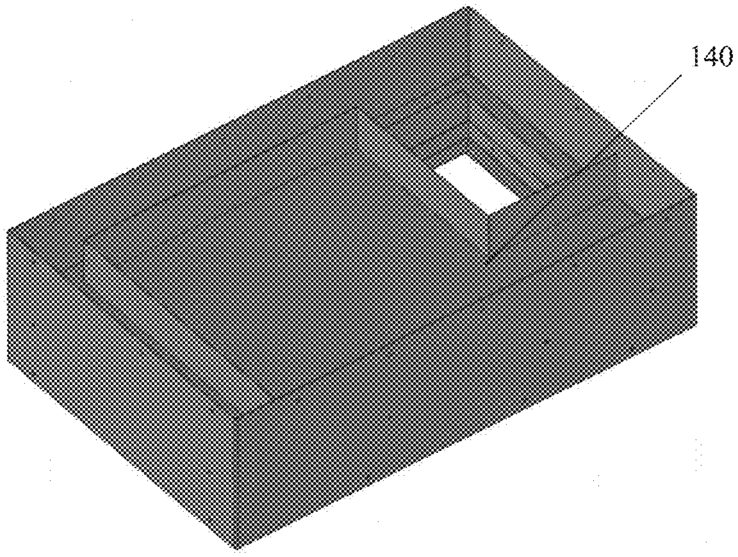
FIG. 6*b* is schematic representation of a second layer of the silencer unit of the integrated noise suppression unit of FIG. 1 in accordance with an embodiment of the present disclosure.

The silencer unit 120 also includes a second layer 140 (as shown in FIG. 6*b*) placed above the first layer 130. The second layer 140 includes a second set of partition strips arranged in a second pre-defined fashion. Each of the second set of partition strips includes a corresponding plurality of square cut-outs arranged in the first pre-defined fashion. In one embodiment, the square cut-outs are positioned in a such way that the cut-outs do not overlap with the first set of partition strips of the first layer 130. More specifically, a bottom portion of the second layer is imposed with the second set of partition strips which is placed above the first layer in such a way that the first set of partition strips and the second set of partition strips sync with each other but do not overlap.

Figure 6C:
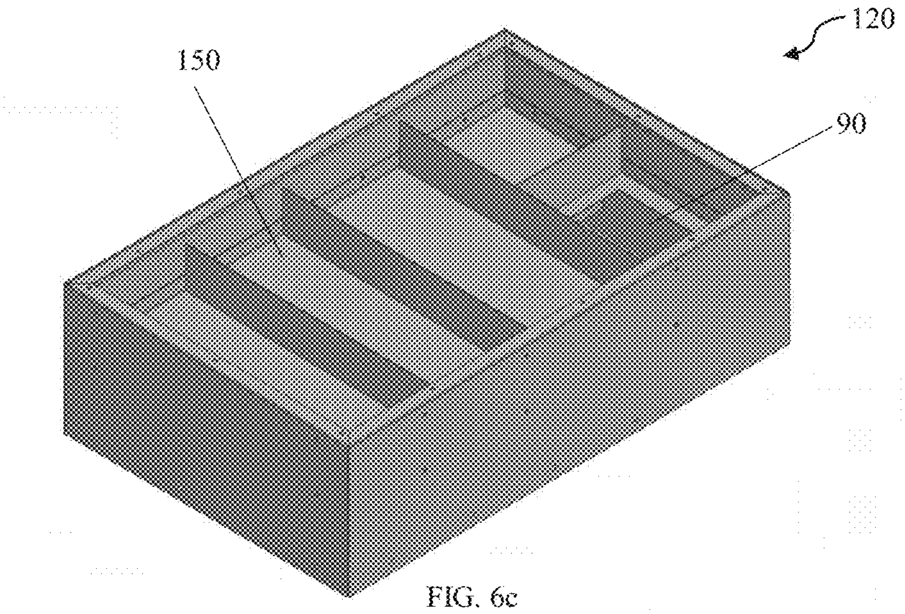
FIG. 6*c* is schematic representation of a third layer of the silencer unit of the integrated noise suppression unit of FIG. 1 in accordance with an embodiment of the present disclosure.
Figure 6D:
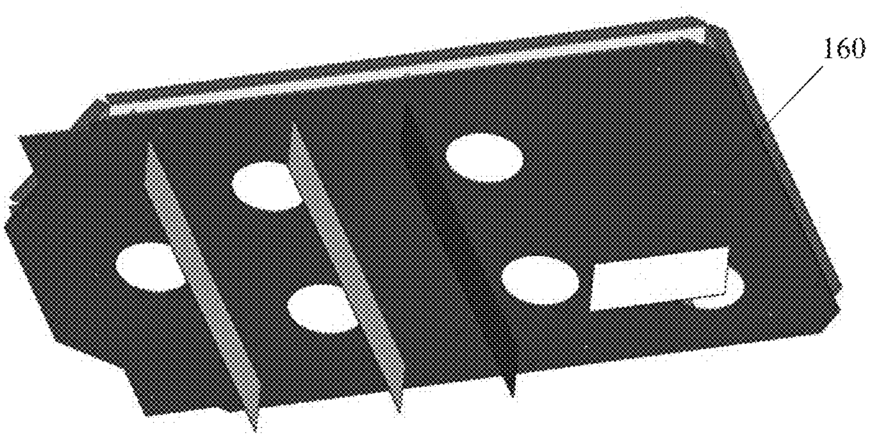
FIG. 6*d* is schematic representation of a fourth layer of the silencer unit of the integrated noise suppression unit of FIG. 1 in accordance with an embodiment of the present disclosure.

The silencer unit 120 also includes a third layer 150 (as shown in FIG. 6*c*) placed above the second layer 140. The third layer 150 includes a third set of partition strips arranged in a third pre-defined fashion. Each of the third set of partition strips comprises a corresponding plurality of square cut-outs arranged in a third pre-defined fashion. The silencer unit 120 also includes a fourth layer 160 (as shown in FIG. 6*d*) placed above the third layer 150. The fourth layer 160 includes a fourth set of partition strips arranged in a fourth pre-defined fashion. Each of the fourth set of partition strips comprises a corresponding plurality of square cut-outs arranged in a fourth pre-defined fashion. More specifically, a bottom portion of the fourth layer 160 is imposed with the fourth set of partition strips, which is placed above the third layer 150 to bring the third set of partition strips and the fourth set of partition strips in sync. Also, there exists a pre-defined amount of gap for the flow of air between the top bottom surface of the fourth layer 160 and the third set of partition strips. Similarly, there exists a gap between the top surface of the third layer 150 and the fourth set of partition strips for the flow of air between the third layer 150 and the fourth layer 160.

Figure 6E:
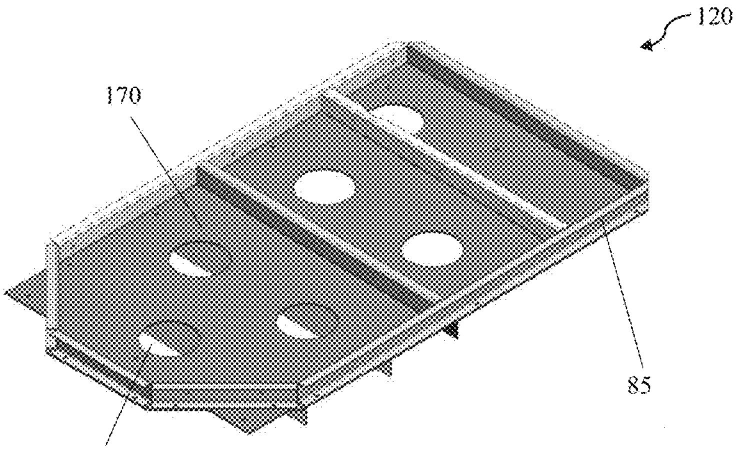
FIG. 6*e* is schematic representation of a fifth layer of the silencer unit of the integrated noise suppression unit of FIG. 1 in accordance with an embodiment of the present disclosure.

The silencer unit 120 further includes a fifth layer 170 (as shown in FIG. 6*e*) placed above the fourth layer 160. The fifth layer 170 includes a fifth set of partition strips 180. Each of the fifth set of partition strips 180 which includes a corresponding plurality of circular cut-outs arranged in a fifth pre-defined fashion. The plurality of circular cut-outs is structured to position the corresponding one or more electric motors 70. More specifically, the position of the corresponding plurality of circular cut-outs are in sync with the position of the corresponding one or more electric motors 70.

Figure 6F:
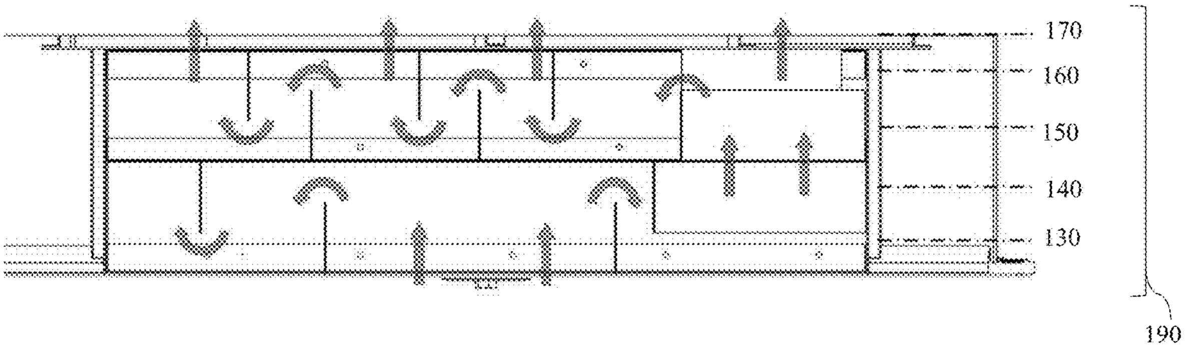
FIG. 6*f* is schematic representation of all the layers of the silencer unit of the integrated noise suppression unit of FIG. 1 in accordance with an embodiment of the present disclosure.

Further, a plurality of layers 190 (as shown in FIG. 6*f*) is arranged one above the other to enable the air to pass between the atmosphere and the tubular cylinder 40 via the plurality of layers 190. The plurality of layers 190 corresponds to the first layer 130, the second layer 140, the third layer 150, the fourth layer 160 and the fifth layer 170 together. In one exemplary embodiment the first layer 130, the second layer 140, the third layer 150, the fourth layer 160 and the fifth layer 170 are padded with sound absorbing material. In such embodiment, the sound absorbing material may be sound absorption foam.

An arrangement of the first set of partition strips, the second set of partition strips and the third set of partition strips forms a pre-defined structure configured to absorb noise developed during operation of the pneumatic vacuum elevator 20 upon air being circulated sequentially from the first layer 130 to the fifth layer 170. In one exemplary embodiment, the first set of partition strips, the second set of partition strips, the third set of partition strips are padded with sound absorbing material. In such embodiment, the sound absorbing material may be sound absorption foam.

In one exemplary embodiment, the apparatus 10 may further include at least four vertical pillars 200 attached with corresponding plurality of outer rings 210. The plurality of outer rings 210 is integrated on an outer surface of the equipment compartment 30. In one exemplary embodiment, the apparatus 10 includes at least two outer rings 210, each of the at least two outer rings may be shaped of an arc, wherein an inner circumference of the arc may be equal to half of an outer circumference of the equipment compartment 30. Further, the at least four vertical pillars 200 may be configured to support the equipment compartment 30 and the plurality of outer rings 210. In one exemplary embodiment, the integrated noise suppression apparatus 10 may be located nearing to a roof 220 of a multi-storied building.

Figure 2:
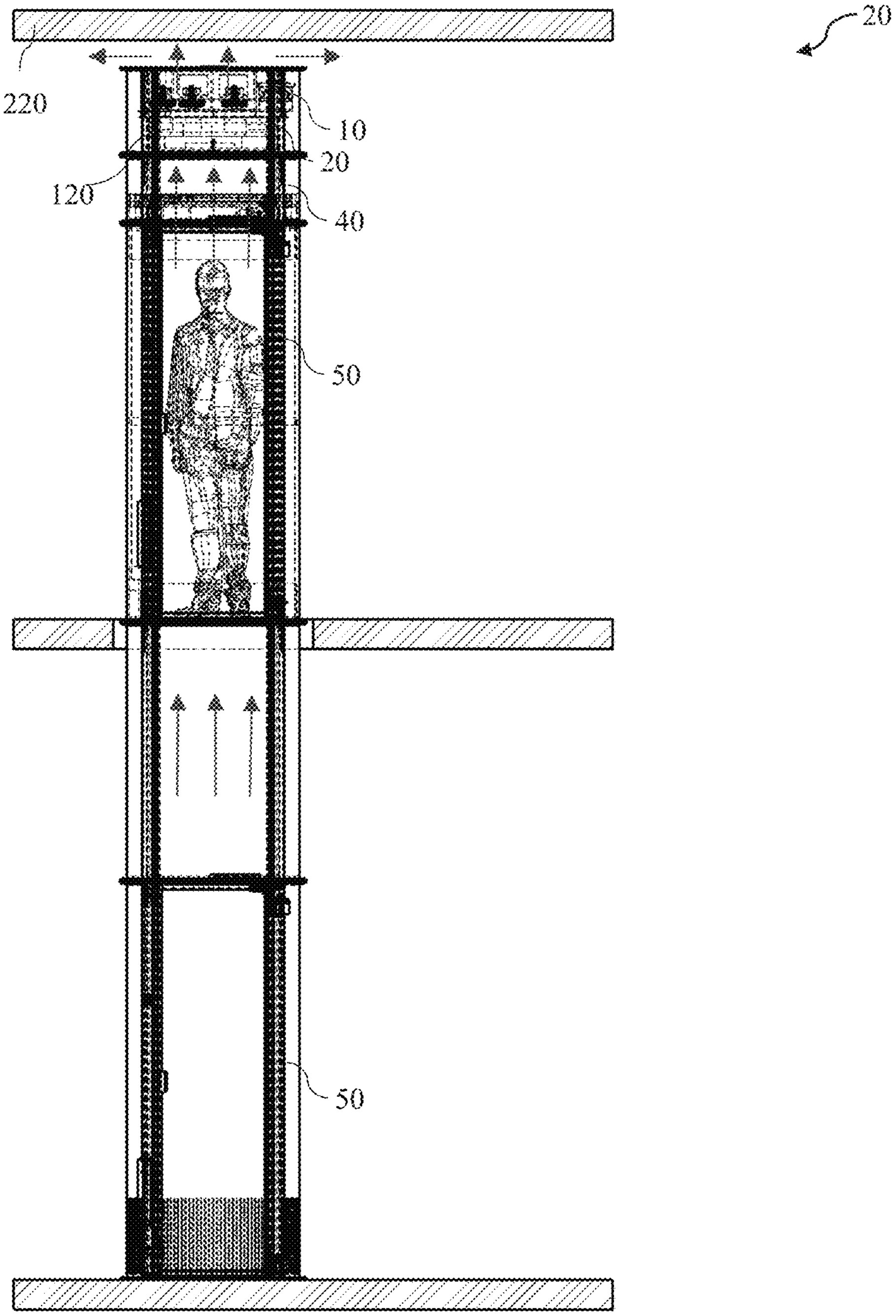
FIG. 2 is a schematic representation of the pneumatic vacuum elevator system moving in upward direction of FIG. 1 in accordance with an embodiment of the present disclosure.

In operation, when the elevator cabin 40 is being operated in an ascending direction (as shown in in FIG. 2), that is when the elevator cabin 20 is moving in the upward direction, the air from the one or more elevator cylinders 50 are sucked by the one or more electric motors 70 via the plurality of layers 190, which is placed beneath the one or more electric motors 70. Air from the plurality of layers 190 passes through the second partition unit 100 and the air is released into the atmosphere. As the air passed through the plurality of layers 190 fabricated using the sound absorption foam, the noise generated by the pneumatic vacuum elevator 20 is reduced.

Figure 3:
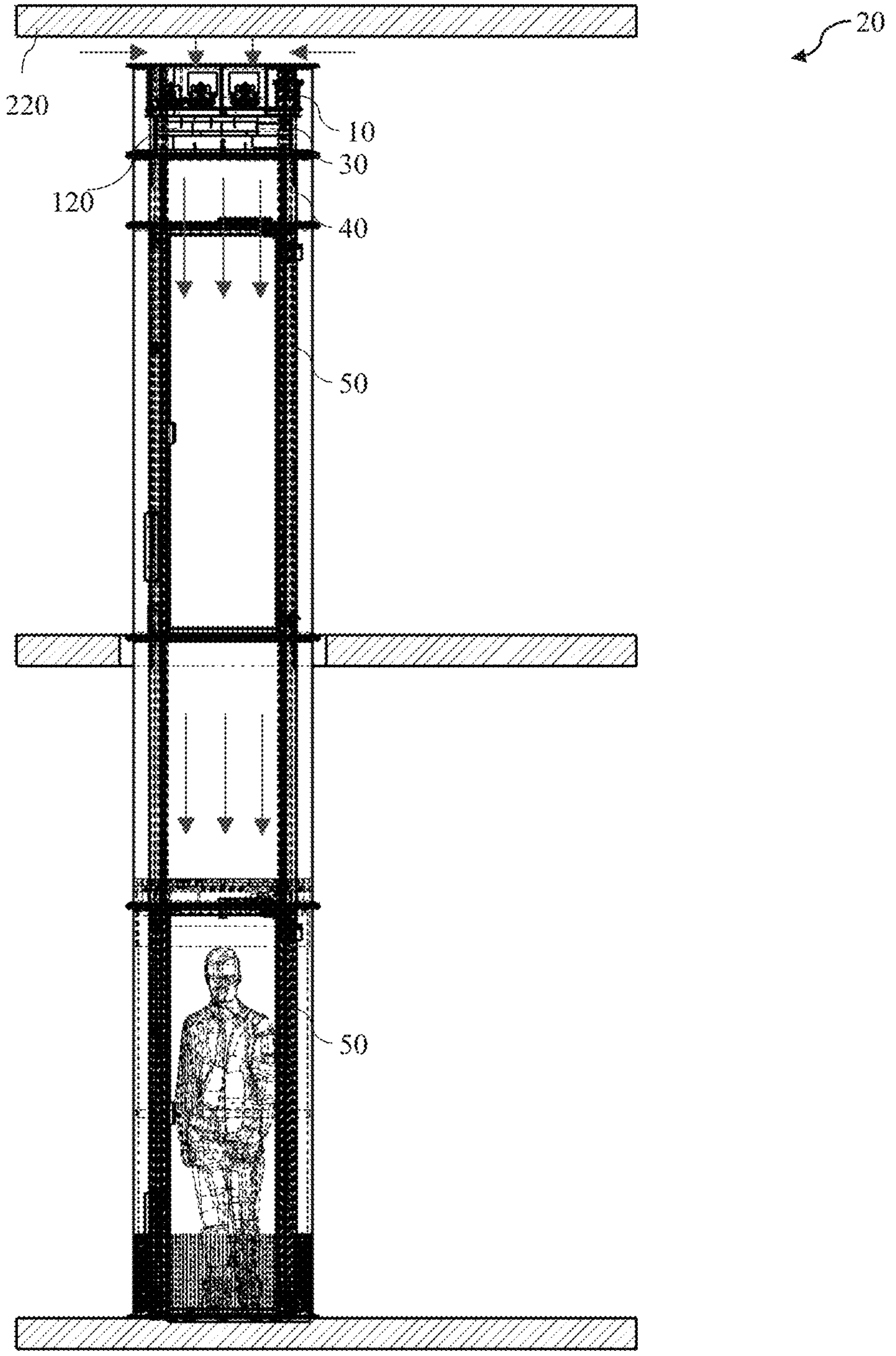
FIG. 3 is a schematic representation of the pneumatic vacuum elevator system moving in downward direction of FIG. 1 in accordance with an embodiment of the present disclosure.

Also, in the scenario where the elevator cabin 50 is being operated in a descending direction (as shown in FIG. 3), that is when the elevator cabin 50 is moving in the downward direction, the air from the atmosphere is allowed into the elevator cabin 50 by the pneumatic flow control unit 90. The air from the atmosphere is allowed by the pneumatic flow control unit 90 to pass through the plurality of layers 190 fabricated using the sound absorption foam, the noise generated by the pneumatic vacuum elevator 50 is reduced.

Various embodiments of the disclosure enable the apparatus to enable the integration of the noise suppression unit along with the one or more one or more elevator cylinders within the available space of the building. The structure of the layers used in the apparatus helps in reduction of noise while the pneumatic vacuum elevator is being operated.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. An integrated noise suppression apparatus (10) for a pneumatic vacuum elevator (20) comprising:

an equipment compartment (30) mounted on top of a cylinder of one or more vertically stacked elevator cylinders (50), wherein the equipment compartment comprises:

a first partition unit (60) vertically surrounding one or more electric motors (70) housed inside the equipment compartment (30), wherein the one or more electric motors (70) are configured to suck air from one or more vertically stacked elevator cylinders (50) and release the air into atmosphere surrounding the equipment compartment (30) to operate the pneumatic vacuum elevator (20) in upward direction;

a bottom plate (80) comprising a channel (85) positioned outside the first partition unit (60), wherein a pneumatic flow control unit (90) placed on top of the bottom plate (80), wherein the pneumatic flow control unit (90) is configured to allow air from the atmosphere into the corresponding one or more elevator cylinders (50) to operate the pneumatic vacuum elevator (20) in downward direction;

a second partition unit (100) mechanically coupled to the first partition unit (60), wherein the second partition unit (100) comprises an opening (110) in a pre-defined shape, wherein the second partition unit (100) is configured to circulate air between the equipment compartment (30) and the atmosphere upon being sucked or released by the one or more electric motors (70) or the pneumatic flow control unit (90) respectively; and a silencer unit (120) placed below the one or more electric motors (70) and the pneumatic flow control unit (90), wherein the silencer unit (120) comprises:

a first layer (130) placed upon the bottom plate (80) and above a tubular cylinder (40), wherein the first layer (130) comprises a first set of partition strips arranged in a pre-defined fashion, wherein each of the first set of partition strips comprises a corresponding plurality of square cut-outs arranged in a first pre-defined fashion, wherein the first set of partition strips is configured to initiate the circulation of air;

a second layer (140) placed above the first layer (130), wherein the second layer (140) comprises a second set of partition strips arranged in a pre-defined fashion, wherein each of the second set of partition strips comprises a corresponding plurality of square cut-outs arranged in a second pre-defined fashion;

a third layer (150) placed above the second layer, wherein the third layer (150) comprises a third set of partition strips arranged in a third pre-defined fashion, wherein each of the third set of partition strips comprises a corresponding plurality of square cut-outs arranged in a third pre-defined fashion;

a fourth layer (160) placed above the third layer (150), wherein the fourth layer (160) comprises a fourth set of partition strips arranged in a fourth pre-defined fashion, wherein each of the fourth set of partition strips comprises a corresponding plurality of square cut-outs arranged in a fourth pre-defined fashion; and a fifth layer (170) placed above the fourth layer, wherein the fifth layer 170) comprises a fifth set of partition strips (180), wherein each of the fifth set of partition strips (180) comprises a corresponding plurality of circular cut-outs arranged in a fifth pre-defined fashion, wherein the plurality of circular cut-outs are structured to position the corresponding one or more electric motors (70), wherein a plurality of layers (190) is arranged one above the other to enable the air to pass between the atmosphere and the tubular cylinder (40) via the plurality of layers (190), and wherein an arrangement of the first set of partition strips, the second set of partition strips and the third set of partition strips forms a pre-defined structure configured to absorb noise generated during operation of the pneumatic vacuum elevator (20) upon air being circulated sequentially from the first layer (130) to the fifth layer (170).

2. The integrated noise suppression apparatus (10) as claimed in claim 1, wherein equipment compartment (30) comprises at least one of Polycarbonate sheet, plastic sheet, acrylic sheet, High-density polyethylene (HDPE) sheet, medium-density fibreboard.

3. The integrated noise suppression apparatus (10) as claimed in claim 1, wherein a first layer (130), a second layer (140), a third layer (150), a fourth layer (160) and a fifth layer (170) are padded with sound absorbing material.

4. The integrated noise suppression apparatus (10) as claimed in claim 1, wherein a first set of partition strips, a second set of partition strips, a third set of partition strips are padded with sound absorbing material.

5. The integrated noise suppression apparatus (10) as claimed in claim 1, comprises at least four vertical pillars (200) attached with corresponding plurality of outer rings (210), wherein the plurality of outer rings (210) is integrated on an outer surface of the equipment compartment (30).

6. The integrated noise suppression apparatus (10) as claimed in claim 1, wherein a tubular cylinder (40) comprises a layer configured to enable the movement of the air between the tubular cylinder (40) and the equipment compartment (50).

7. A pneumatic vacuum elevator (20) comprising:

one or more vertically stacked elevator cylinders (50) configured to enable one or more users to move between a plurality of floors of a multi-storied building;

an integrated noise suppression apparatus (10) integrated on top of the one or more elevator cylinders (50), wherein the integrated noise suppression apparatus (10) comprises:

an equipment compartment (30) mounted on top of a cylinder of one or more vertically stacked elevator cylinders (50), wherein the equipment compartment comprises:

a first partition unit (60) vertically surrounding one or more electric motors (70) housed inside the equipment compartment (30), wherein the one or more electric motors (70) are configured to suck air from one or more vertically stacked elevator cylinders (50) and release the air into atmosphere surrounding the equipment compartment (30) to operate the pneumatic vacuum elevator (20) in upward direction;

a bottom plate (80) comprising a channel (85) positioned outside the first partition unit (60), wherein a pneumatic flow control unit (90) placed on top of the bottom plate (80), wherein the pneumatic flow control unit (90) is configured to allow air from the atmosphere into the corresponding one or more elevator cylinders (50) to operate the pneumatic vacuum elevator (20) in downward direction;

a second partition unit (100) mechanically coupled to the first partition unit (60), wherein the second partition unit (100) comprises an opening (110) in a pre-defined shape, wherein the second partition unit (100) is configured to circulate air between the equipment compartment (30) and the atmosphere upon being sucked or released by the one or more electric motors (70) or the pneumatic flow control unit (90) respectively;

a silencer unit (120) placed below the one or more electric motors (70) and the pneumatic flow control unit (90) and configured to absorb noise developed during operation of the pneumatic vacuum elevator (20) upon air being circulated sequentially from the first layer (130) to the fifth layer (170), wherein the silencer unit (120) comprises:

a first layer (130) placed upon the bottom plate (80) and above a tubular cylinder (40), wherein the first layer (130) comprises a first set of partition strips arranged in a pre-defined fashion, wherein each of the first set of partition strips comprises a corresponding plurality of square cut-outs arranged in a first pre-defined fashion, wherein the first set of partition strips is configured to initiate the circulation of air;

a second layer (140) placed above the first layer (130), wherein the second layer (140) comprises a second set of partition strips arranged in a pre-defined fashion, wherein each of the second set of partition strips comprises a corresponding plurality of square cut-outs arranged in a second pre-defined fashion;

a third layer (150) placed above the second layer, wherein the third layer (150) comprises a third set of partition strips arranged in a third pre-defined fashion, wherein each of the third set of partition strips comprises a corresponding plurality of square cut-outs arranged in a third pre-defined fashion;

a fourth layer (160) placed above the third layer (150), wherein the fourth layer (160) comprises a fourth set of partition strips arranged in a fourth pre-defined fashion, wherein each of the fourth set of partition strips comprises a corresponding plurality of square cut-outs arranged in a fourth pre-defined fashion;

a fifth layer (170) placed above the fourth layer, wherein the fifth layer (170) comprises a fifth set of partition strips (180), wherein each of the fifth set of partition strips (180) comprises a corresponding plurality of circular cut-outs arranged in a fifth pre-defined fashion, wherein the plurality of circular cut-outs are structured to position the corresponding one or more electric motors (70), wherein a plurality of layers (190) is arranged one above the other to enable the air to pass between the atmosphere and the tubular cylinder (40) via the plurality of layers (190), and wherein an arrangement of the first set of partition strips, the second set of partition strips and the third set of partition strips forms a pre-defined structure configured to absorb noise developed during operation of the pneumatic vacuum elevator (20) upon air being circulated sequentially from the first layer (130) to the fifth layer (170).

8. The pneumatic vacuum elevator (20) as claimed in claim 7, wherein a first layer (130), a second layer (140), a third layer (150), a fourth layer (160) and a fifth layer (170) are composed of sound absorbing material.

9. The pneumatic vacuum elevator (20) as claimed in claim 7, wherein a first set of partition strips, a second set of partition strips, a third set of partition strips are composed of sound absorbing material.

* * * * *